United States Patent
Schonberger, Sr.

(10) Patent No.: US 6,923,173 B2
(45) Date of Patent: Aug. 2, 2005

(54) HOT AIR FURNACE

(76) Inventor: Marty L. Schonberger, Sr., 7417 Tattersall St., Chesterland, OH (US) 44026

( * ) Notice: Subject to any disclaimer, the term of this patent is extended or adjusted under 35 U.S.C. 154(b) by 0 days.

(21) Appl. No.: 10/804,035

(22) Filed: Mar. 19, 2004

(65) Prior Publication Data

US 2005/0092316 A1   May 5, 2005

Related U.S. Application Data

(60) Provisional application No. 60/517,262, filed on Nov. 4, 2003.

(51) Int. Cl.[7] .................................................. F24H 3/02
(52) U.S. Cl. .................................................. 126/110 R
(58) Field of Search ........................... 126/72, 99 A, 126/110 R, 110 B, 110 AA; 431/1; 110/343; 165/122, 126

(56) References Cited

U.S. PATENT DOCUMENTS

| | | |
|---|---|---|
| 2,109,876 A | 3/1938 | Bard |
| 2,529,574 A | 11/1950 | Rush |
| 2,836,169 A | 5/1958 | Reilly |
| 2,902,265 A | 9/1959 | Dubovick |
| 3,028,854 A | 4/1962 | Reilly |
| 3,580,237 A | 5/1971 | Barsby et al. |
| 3,667,451 A | 6/1972 | Boucher |
| 4,037,582 A | 7/1977 | Moody |
| 4,182,303 A | 1/1980 | Muckelrath |
| 4,252,520 A | 2/1981 | Bratko |
| 4,289,730 A | 9/1981 | Tomlinson |
| 4,319,557 A | 3/1982 | Sietmann et al. |
| 4,336,791 A | 6/1982 | Kitchhen |
| 4,342,359 A | 8/1982 | Baker |
| 4,351,276 A | 9/1982 | Kremer |
| 4,478,158 A | 10/1984 | Smith |
| 4,515,145 A | 5/1985 | Tallman et al. |
| 4,557,249 A | 12/1985 | Sweedyk |
| 4,718,401 A | 1/1988 | DeLancey |
| 4,960,102 A * | 10/1990 | Shellenberger ......... 126/110 R |
| 5,313,930 A * | 5/1994 | Kujawa et al. ......... 126/116 R |
| 5,368,010 A * | 11/1994 | Weber et al. ........... 126/110 R |
| 5,437,263 A * | 8/1995 | Ellingham et al. ...... 126/110 R |
| 5,775,318 A * | 7/1998 | Haydock et al. ........ 126/110 R |

* cited by examiner

*Primary Examiner*—Stephen Gravini
(74) *Attorney, Agent, or Firm*—Watts Hoffman Co., LPA

(57) ABSTRACT

Disclosed is a high efficiency hot air furnace including a heat exchanger assembly located in a heat exchange chamber through with comfort air is passed to be heated. The heat exchanger assembly includes a drum like combustion member located in the flow path of comfort air. A supplemental heat exchanger or condenser is disposed in the flow path of comfort air upstream from the combustion member. A transfer channel extends from one end of the combustion member and communicates combustion products to the condenser. The combustion member includes an insulating material on the inside portion of the cylindrical wall. A diffuser is located within the combustion member which prevents the burner flame from extending into the transfer channel. The burner includes a blower for urging combustion gases through the heat exchanging assembly. Intake air for the blower is provided by an air intake chamber.

38 Claims, 4 Drawing Sheets

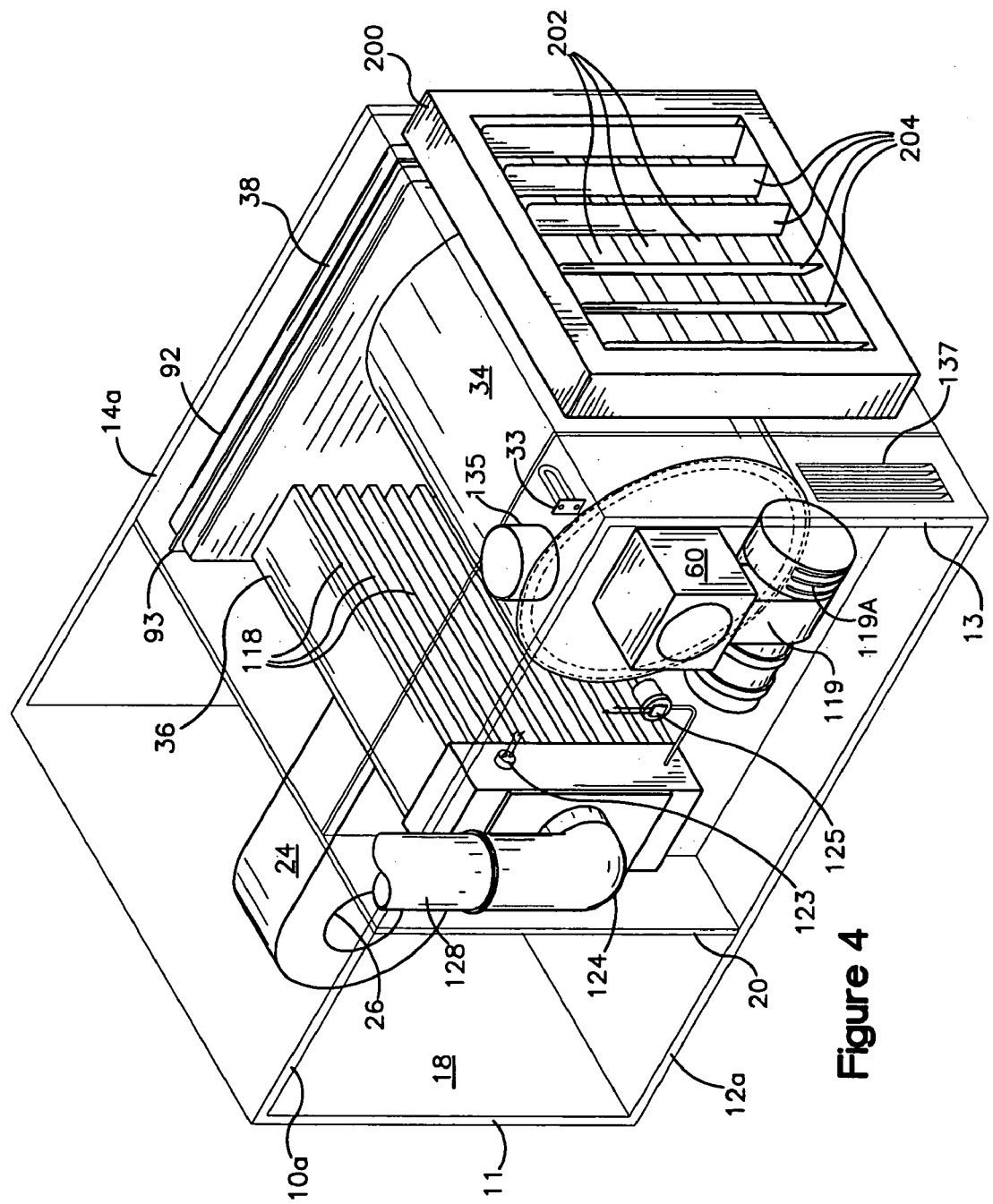

HOT AIR FURNACE

CLAIM FOR PRIORITY

The present application is a non-provisional application claiming priority from U.S. Provisional Application Ser. No. 60/517,262 filed on Nov. 4, 2003, entitled HOT AIR FURNACE.

FIELD OF THE INVENTION

The present invention relates generally to furnaces and in particular to an oil fired, condensing mode hot air furnace.

BACKGROUND

Conventional hot air furnaces used in residential and commercial buildings generally include a fuel burner which burns oil, gas or other suitable fuel. The burner heats a heat exchanger which is positioned in a flow path of air to be heated (often termed "comfort air"). Heat from the combustion chamber is transferred to the air and the air is then distributed throughout the building.

Many prior art furnaces include rather large heat exchangers in order to maximize the heat extracted from the combustion of fuel. The more efficiency desired, the larger the heat exchanger must be. Alternately, supplementary heat exchangers must be provided.

In many prior art furnaces, the air necessary for the combustion of fuel is drawn from the immediate vicinity of the furnace. The by-products of combustion are then conveyed to a flue or chimney and are exhausted directly to the environment. In this type of furnace, the so-called "stack temperature" is high and as a result the exhaust products carry away a substantial quantity of heat and exhaust it to the chimney or flue. This heat loss substantially reduces the efficiency of the furnace.

The need for conserving energy has, in recent years, prompted the design of more efficient furnaces. Attempts at improving the efficiency of a hot air furnace have included designs intended to recover some of the heat lost "up the chimney". One such design included the use of a supplementary heat exchanger that is heated by the exhaust by-products and which is also positioned in the path of air being heated. In one arrangement known as a condensing mode furnace, the supplementary heat exchanger is positioned at the comfort air inlet so that the air is preheated before passing over the primary heat exchange surfaces (i.e., the surfaces heated directly by the combustion chamber). As the comfort air passes through the supplementary heat exchanger, heat is absorbed from the heat exchanger and the temperature of the flue gases is substantially reduced. If the supplemental heat exchanger is properly designed, water vapor is condensed, hence the term "condensing mode" furnace. As is known, a change in state of water from vapor to liquid causes a substantial release of energy which is transferred to the comfort air.

A condensing mode furnace can substantially reduce the stack temperature of the combustion by-products. In many, if not most of these types of furnaces, a supplementary blower often termed an "induced draft" blower is used to encourage the flow of exhaust gases to the flue, chimney or other discharge conduit.

An example of a condensing mode furnace that utilizes an "induced draft" blower is described in U.S. Pat. No. 4,718, 401, which is hereby incorporated by reference. Furnaces constructed in accordance with the '401 patent have proven commercially successful. However, it has been found that under certain operating conditions, some instability in the burning process may occur.

Additionally, it has also been observed in prior art furnaces that products of combustion condense prior to reaching the condenser. This reduces the efficiency of the furnace and leads to poor heating of comfort air. Premature condensation may also result in corrosion of furnace components upstream of the condensing heat exchanger.

DISCLOSURE OF THE INVENTION

The present invention relates to a hot air furnace. The hot air furnace includes a heat exchanging chamber where a blower urges comfort air through the chamber to duct work which leads to areas in need of heat. The furnace further includes a heat exchanging assembly located in the heat exchanging chamber and in heat exchanging contact with the comfort air passing through the heat exchanging chamber. The heat exchanger includes a combustion member having a cylindrical wall portion which communicates with a burner. The burner can be any conventional oil or gas fired burner.

In the illustrated embodiment, the combustion member defines a primary heat exchange surface positioned in the flow of passing comfort air. The combustion member is drum like in construction and has an outer heat exchanging surface. As illustrated, an insulating material is affixed to the inside portion of the cylindrical wall. Typically, the insulating material is a blanket, however, other insulating means may be employed. The insulating material prevents heat from being rapidly exchanged from the combustion gases to the comfort air via the heat exchanging surface. This allows combustion gases to remain in their gaseous state while being urged into a transfer member.

In one embodiment, a transfer member connects the combustion member with a condenser. In a preferred embodiment, the transfer member is connected to the opposite end of the combustion member and provides a path for combustion gases from the combustion member to the condenser.

In the illustrated embodiment, the condenser is positioned in the flow path of comfort air upstream from the combustion member. In one embodiment, the condenser includes a condensate collector box which is located on the downstream portion of the condenser relative to the flow of combustion gases through the heat exchanging assembly. According to another feature of this embodiment, the collector box includes a pressure relief switch which shuts down the burner when excessive pressure is detected at the condensate box. In accordance with another feature, the condensate collector box includes a high temperature cut off switch which will shut down the burner when excessive temperature is detected at the condensate collector box.

The heat exchanging assembly burner includes a blower which has air intakes for supplying air to the combustion member. In the illustrated embodiment, the furnace includes an air intake chamber which communicates with the air intakes of the burner blower for supplying air to the combustion member which further urges combustion gases through the heat exchanging assembly. In one embodiment, the air intake chamber has a vent which leads outside of the heating structure. In this embodiment, air being drawn in by the burner blower is a mixture of air from outside the heating structure and air inside the heating structure.

In the illustrated embodiment, a structure defining a flame target and gas diffuser is located inside of the combustion chamber. It is preferred that the structure be constructed of ceramic and is cup-like in construction. An open end of the cup is oriented towards the burner. The end face of the cup is located adjacent an outlet of the combustion chamber which communicates with the transfer channel. The target/ diffuser serves two functions. Firstly, it forces the products of combustion to travel around the outside of the cup and in close proximity to the inside surface including an insulating material of the primary heat exchanger before proceeding to the outlet. The circuitous path provides sufficient dwell time for the heat exchanging process to occur. Secondly, the diffuser/target provides a flame stop to prevent the flame from extending into the outlet of the combustion chamber should the flow characteristics of the burner blower or burn rate of the burner changer during operation.

In an alternative embodiment, the features of the present invention are incorporated into a unit heater. A unit heater according to the present invention may be employed to heat large areas such as but not limited to repair shops, factories, sport halls, storage areas, green houses and large public places. Typically, the unit heater is suspended from the ceiling of the area to be heated and vents direct air to desired locations. The present unit heater operates in the same manner as the hot air furnace, however, the unit is rotated 90° such that the comfort air blows horizontally across the heat exchangers and exits a opening in a side portion of the unit heater. This exit opening further includes an air-directing vent with includes horizontal louvers which direct the air in a direction horizontal to the flow of comfort air over the horizontal louver and a set of vertical louvers which direct air in a direction vertical to the flow of comfort air over the vertical louver.

Additional features of the invention will become apparent and a fuller understanding obtained by reading the following detailed description made in connection with the accompanying drawings.

BRIEF DESCRIPTION OF THE DRAWINGS

FIG. 4 shows a perspective view of a unit heater incorporating the features of the present invention.

DETAILED DESCRIPTION

Figure 1:
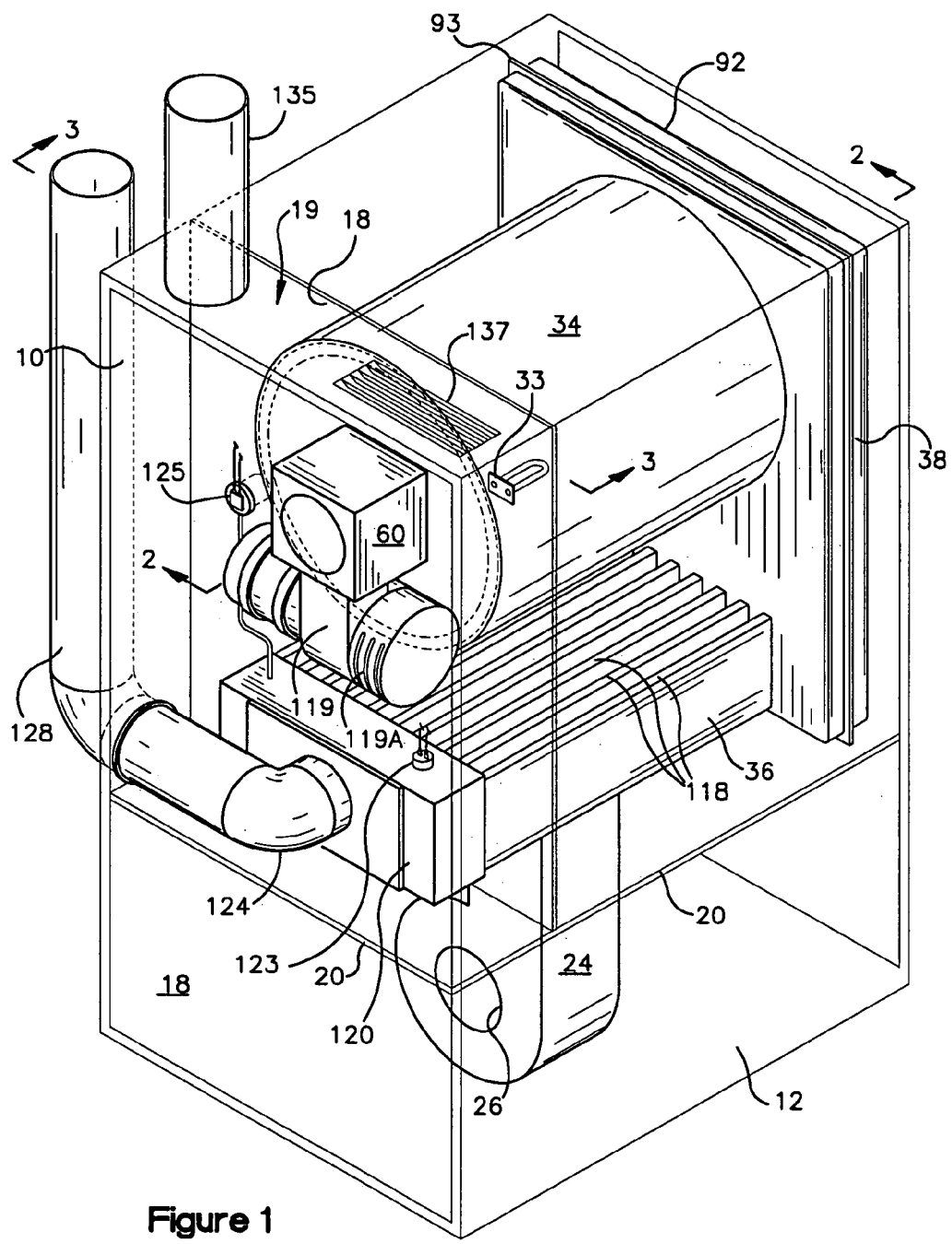
FIG. 1 shows a perspective view of a furnace according to the present invention.
Figure 2:
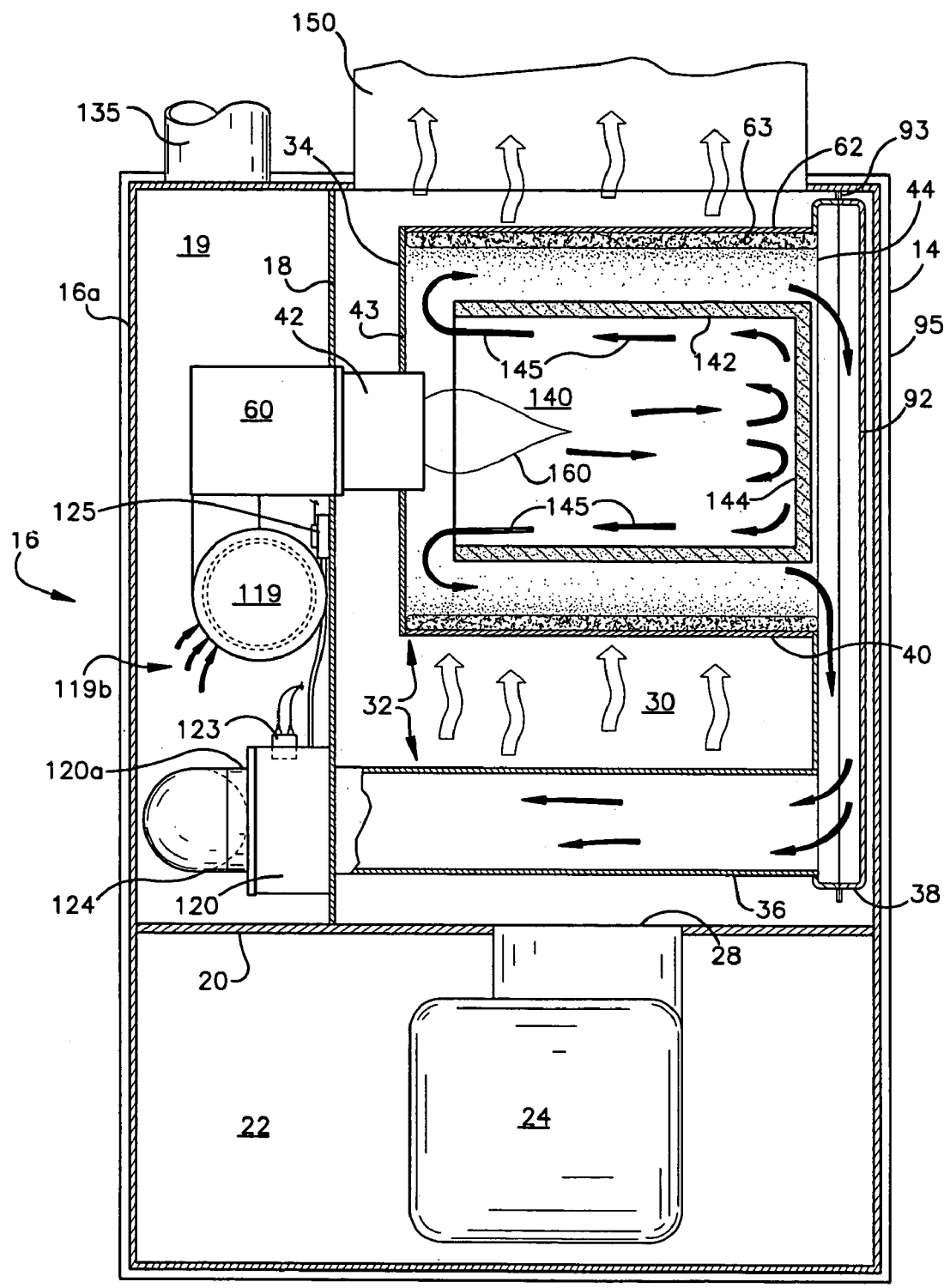
FIG. 2 is a cross-sectional view of the furnace according to FIG. 1 taken along line 2—2.
Figure 3:
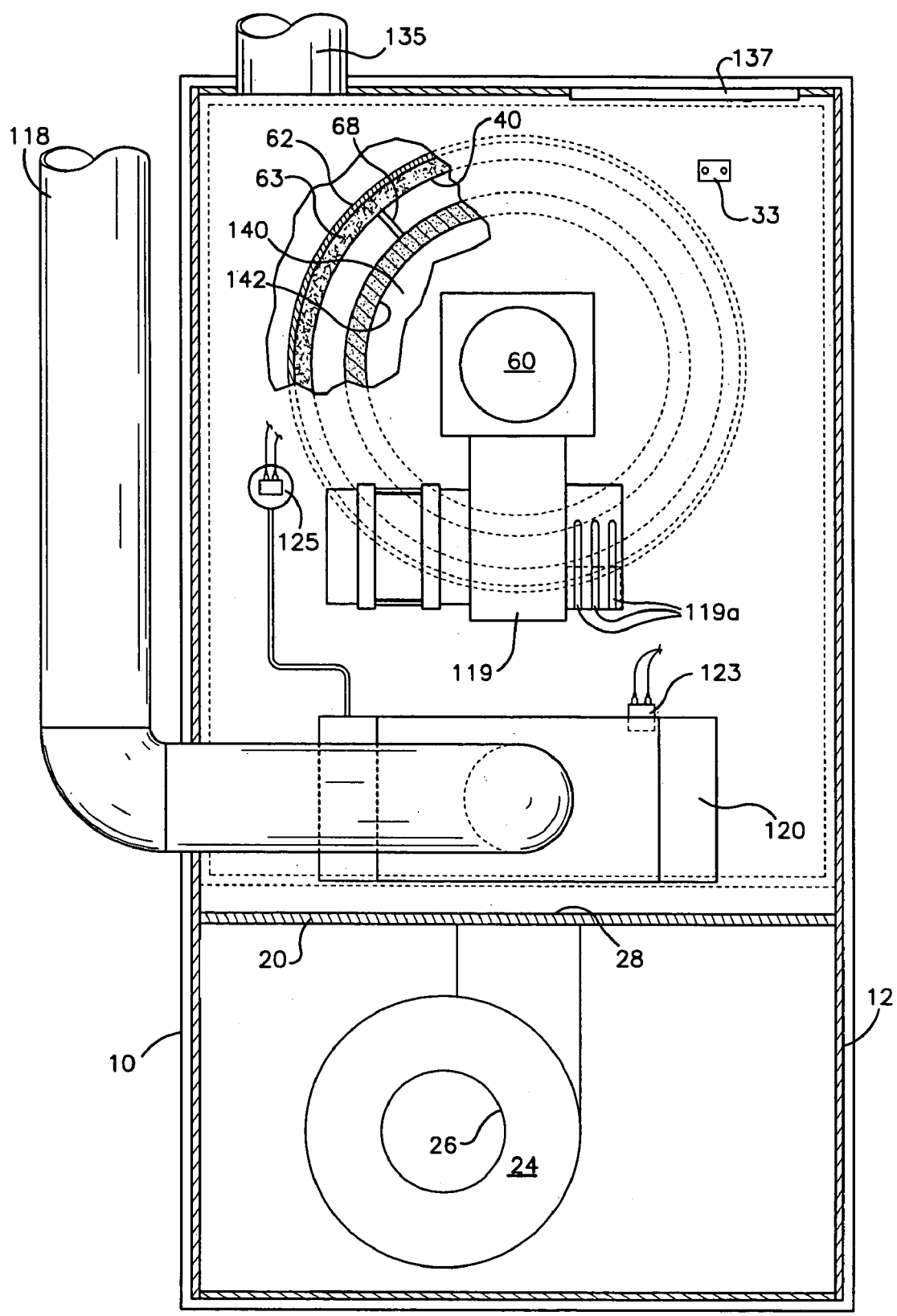
FIG. 3 is a side view of the furnace according to FIG. 1.

FIGS. 1–3 illustrate the overall construction of a hot air furnace embodying the present invention. Referring first to FIGS. 1 and 2, the furnace includes frame structure defined in part by side walls 10, 12 and rear wall 14. The front of the furnace indicated generally by the reference character 16 in FIG. 2 is enclosed by a removable front wall 16a which may be in the form of an access door (not shown), as is conventional. An intermediate panel 18 is positioned inwardly with respect to the outer front wall 16a or door (not shown) of the furnace and extends between the side walls 10, 12. The intermediate panel 18, the front wall 16a and the portions of the sidewalls 10, 12 between the panel 18 and front wall 16a together define a combustion air inlet chamber 19 (shown best in FIG. 2).

A transverse support self 20 is mounted a predetermined distance above the base of the furnace. A comfort air input chamber 22 which houses a conventional furnace blower 24 having an axial inlet 26 (shown only in FIGS. 1 and 3) is defined below the support self 20. The furnace blower 24 is mounted to the underside of the shelf 20 and defines an inlet opening indicated generally by the reference character 28 through which comfort air to be heated is discharged by the blower 24.

The shelf 20 together with the intermediate front panel 18, side walls 10, 12 and the rear wall 14 define a heat exchange chamber 30 (FIG. 2) through which the comfort air passes to be heated. In accordance with the invention, a relatively compact heat exchanger assembly 32 is mounted atop the support shelf 20 and heats comfort air as it travels through the heat exchanger chamber 30.

Referring in particular to FIGS. 2 and 3, the heat exchanger assembly 32 comprises a primary, drum like heat exchanger member 34 and a secondary heat exchanger 36 interconnected by a chamber-like transfer conduit or channel 38 including heat exchange surface. The primary heat exchanger 34 is drum-like in construction and includes a cylindrical wall 40 which extends from an end wall 43 to an inner wall portion 44 where the inner wall portion 44 forms part of the transfer conduit 38. The front panel 18 includes a bore (not shown) exposing the primary heat exchanger 34 to a portion of a burner 60 via a flange 42. A high temperature cut-off generally 33 is supported by the front panel 18. The high temperature cutoff is sometimes referred to as a high limit switch. The high temperature cutoff extends through the front panel 18 and is exposed to the inside of the heat exchanger chamber 30. During operation, if the combustion chamber produces temperatures above a safe level, the cut-off switch 33 will be activated to shut down the burner to prevent any further heating. This feature prevents excessive heat from being generated.

According to the invention, the cylindrical wall 40 includes an outer heat exchange surface 62. In a preferred embodiment, an insulating material 63 communicates with the inner side of the outer heat exchange surface 62. The insulating material 63 reduces the rate of heat transfer to the comfort air through the primary heat exchanger. This in turn allows the combustion gases to exit the heat exchange chamber 30 in their gaseous state, thus, improving the overall efficiency of the furnace and reducing the potential of corrosion upstream of furnace components upstream of the heat exchanger 36.

The heat exchanger assembly 32 is supported by a support shelf 20. The support shelf 20 is attached to the side walls 10, 12 and rear wall 14 in a conventional manner. The support shelf 20 includes an opening (not shown) where comfort air from the blower 24 is forced through the heat exchange assembly 32. As is conventional, the heated air leaving the furnace is distributed throughout a structure (i.e. home, building, etc.) by means of duct work (not shown). The support shelf 20 supports the blower 24 through conventional means.

The secondary heat exchanger 36 is positioned between the drum like heat exchange chamber 34 and the support shelf 20. The primary drum like heat exchanger 34 is supported above the secondary heat exchanger 36 relative to the flow of comfort air. One end of the primary heat exchanger 34 is supported by a front panel 18 which is secured on its lower end to the support shelf 20. The sides of the front panel 18 are positioned and secured to the side walls 10, 12. On the opposite end of the primary heat exchanger 34 relative to the front panel 18, is fixed to the inner wall 44 of the transfer conduit 38 such as by welding.

As illustrated in FIGS. 1 and 2, the transfer channel 38 is substantially rectangular in construction and is defined by the inner portion 44 and outer portion 92. The inner portion 44 and outer portion 92 are each "U-shaped" and include a lip. The lip of the inner portion 44 contacts the lip of the outer portion 92 to form a joint 93. When joined together the portions 44, 92 define the transfer channel 38. As indicated above, the rear of the primary heat exchanger 34 is attached to the upper portion of the transfer channel 38. The inside of the primary heat exchanger which defines the combustion chamber communicates with the inside of the transfer conduit 38. The lower portion of the transfer conduit 38 communicates with an input side of the secondary heat exchanger 36. The transfer conduit 38 heats comfort air as it passes through the region 95 that is defined between the outside of the transfer channel and the inside of the rear furnace panel 14.

The secondary heat exchanger 36 is often termed a condenser and its purpose is to extract additional heat from the products of combustion and in particular, to extract the latent heat of vaporization that is released when water vapor condenses. In the illustrated embodiment, the condenser 36 is conventional in construction and includes a plurality of transfer tubes (not shown) that extend between the inlet of the condenser 36 and the outlet.

The transverse dimensions of the condenser 36 as well as the diametral extent of the primary heat exchanger or combustion member 34 are preferably selected such that both members extend across the entire flow path of comfort air. As a result, the need for baffles to direct comfort air toward the various heat exchange surfaces is minimized.

Returning to FIG. 2, the interconnection between the heat exchange assembly 32 and the peripheral equipment is illustrated. An oil-fired burner 60, is attached to the front panel and communicates with the burner opening through a nipple (not shown). The burner 60 includes a sealing end flange 42 (FIG. 2) which provides a gas tight connection between the burner 60 and the combustion chamber defined within the heat exchange member 34. The burner 60 is attached to the primary heat exchanger through conventional means. It should be noted here that a powered gas-fired burner may be used in place of the illustrated oil burner.

The burner 60 includes a blower 119 which forces combustion air into the combustion chamber. The blower 119 includes a plurality of air intakes 119*a* (best shown in FIGS. 1 and 2) which draw air from the combustion air inlet chamber 19 (intake or combustion air is indicated by the curved arrows 119*b* in FIG. 2). The oil burner 60 may be of conventional construction. Oil fired burners that are suitable for use in the disclosed furnace are available from Adams Manufacturing Company, R. W. Beckett Corporation, and Riello. One such burner is commercially available from Adams Manufacturing and sold under the name InterBurner Mark 10.

In the preferred invention, intake air for the oil burner 60 is drawn from the combustion air intake chamber 19 which as described above is defined by the furnace housing or cabinet. In the preferred embodiment, the intake chamber 19 communicates with outside combustion air through a conduit 135. In this preferred embodiment, air is also drawn into the intake chamber 19 from the immediate vicinity of the furnace location through louvers 137 formed in the combustion air intake chamber 19. With this configuration, the air being drawn into the oil burner is a mixture of outside air (i.e., outside the structure being heated) and indoor air (i.e., air taken from within the heated structure). With this intake arrangement, the air entering the burner is at least partially heated and it is believed furnace operation is substantially improved.

The combustion gases are urged through the heat exchanger assembly by the combustion air blower 119 that forms part of the burner 60. The blower 119 forces air into the combustion chamber urging the combustion gases along the cylinder wall 40 into the transfer conduit 38. From the conduit 38 the gases enter the secondary heat exchanger 36 and exit the heat exchange assembly through an exhaust conduit 128. A plurality of heat exchange plates 118 surround the transfer tubes and define substantial heat exchange surfaces by which heat from the products of combustion are transferred to the incoming comfort air prior to reaching the primary heat exchanger 34.

As is apparent from FIG. 2, a portion of the secondary heat exchanger 36 extends through the front panel 18. The secondary heat exchanger 36 terminates at a condensate collector box 120 having an outlet 120*a* which in turn is connected to the exhaust conduit 128 by means of a 90° elbow 124. The by-products are exhausted to the atmosphere by the exhaust conduit 128. In addition, the outlet end of the secondary heat exchanger 36 communicates with an auxiliary limit switch 123. The auxiliary limit switch 123 shuts down the burner if excessive temperature is generated at the condensate collector box 120 similar to the high limit switch 33. A pressure switch 125 communicates with the condensate box 120 and burner 60. The pressure switch 125 will be activated in the event that excessive pressure builds up in the condensate box 120. Excessive pressure can result from the outside flue being blocked or in situations where combustion products cannot be released through the vent 128.

Referring to FIGS. 2 and 3, the details of the combustion process as well as the flow path for the products of combustion are described in detail. As indicated above, a portion of the burner 60 extends into the burner opening in the front panel 18. According to the invention, a diffuser 140 is located within the combustion chamber and is defined by a cylindrical side wall 142 and an end wall 144 attached to one end of the cylindrical wall 142. The diffuser looks like a transversely positioned, open topped cylindrical container. The diffuser which is preferably constructed of ceramic or like material is located such that its central axis is substantially coincident with a central axis of the burner. The diffuser is separated from the cylinder wall 40 by a partition 68 (best shown in FIG. 3). The cylindrical side wall 142 extends towards the burner and substantially envelops a burner flame 160.

As should be apparent, the circular end wall 144 blocks the direct communication of the central portion of the combustion chamber with the transfer conduit 38. With the disclosed construction, the diffuser forces the products of combustion to travel in the path indicated by the arrows 145 in the figures. This circuitous path causes the products of combustion to flow along the inside surface of the cylindrical wall section 40 of the primary heat exchanger 34 thus providing significant dwell time for the products of combustion. During this dwell time substantial amounts of heat can be transferred to the cylindrical wall 40. After traveling around the diffuser 140 the products can then flow into the transfer channel 38. As the products travel downwardly through the transfer channel 38, additional heat is transferred to the inner and outer channel walls 44, 90. The products then enter the condenser 36 where additional heat is extracted from the combustion products before the products are exhausted to the atmosphere. In prior art furnace systems, the products of combustion tend to condense upon entering a transfer channel. This early condensation led to less efficient heat exchange. The present invention includes features which reduce the incidence of condensation of the products of combustion prior to reaching the condenser 36. In particular, the present invention employs an insulating material 63 which insulates the drum like heat exchanger 34 and reduces the rate of heat flow to the comfort air passing by the surface 62. This insulating material thus inhibits the products of combustion from condensing prior to exiting the primary heat exchanger 34 and/or the transfer conduit 38. Moreover, the drum-like heat exchanger 34 along with the transfer conduit 38 preferably do not include "fins" or other heat exchange structures that would otherwise extract more heat from the products of combustion and possibly result in premature condensation. In the preferred and illustrated construction, most if not all the products of combustion will remain in a vapor state until reaching the condenser 38 where they will ultimately condense. The features of the present invention increase furnace efficiency over prior art furnaces by urging the products of combustion to the secondary heat exchanger 36 prior to condensing.

With the disclosed heat exchanger construction, substantial furnace efficiencies can be realized. During furnace operation, comfort air enters the heat exchange chamber 30 through inlet 28. A major portion of the comfort air passes through the condenser 36 and is initially heated. A minor portion of the comfort air passes through the region 95 defined between the outer wall 90 of the transfer channel and the inside of the rear furnace panel 14. Comfort air traveling between the outer panel 90 of the transfer member 38 and the rear furnace wall 14 pass by the walls of the transfer channel 38 and is heated. Before entering the furnace plenum 150 (shown in FIG. 2), the major portion of the comfort air (represented by outlined arrows in FIG. 2) after passing through the condenser 36 travels around the primary heat exchange member 34 and receives substantial amounts of heat as it passes over the heat exchange surface 62.

The diffuser 140 in addition to forcing the products of combustion to take a circuitous flow path also serves another purpose. The diffuser acts as a "target" for the burner flame and should the flame length change i.e., lengthen, reduces the chance of damage to the transfer conduit 38. In effect, the diffuser 140 contains the flame and prevents change in the flame which can be expected during normal operation especially when using an oil burner, from having a deleterious effect on the sheet metal components of the transfer channel 38.

In the preferred method of operation for the disclosed furnace, the burner operation includes both "pre-purge" and a "post-purge" steps. Specifically, when a thermostat, connected to the furnace (not shown) calls for heat, the burner control (not specifically shown) which forms part of the burner 60 activates the blower 119 for a predetermined length of time. The activation of the blower forces air through the heat exchanger assembly (including both the primary and secondary heat exchangers 34,36) and out the exhaust conduit 128. This "purging" is maintained for a predetermined time, at the conclusion of which, an oil pump (not shown) forming part of the oil burner is activated to begin injecting oil into the burner where it is ignited. When a desired temperature is reached in the structure being heated (as determined by the thermostat) a signal is issued to terminate burner operation. At this point, the burner controller deactivates the oil pump so that combustion is terminated. However, the controller maintains operation of the blower 119 for a predetermined time period in order to purse all combustion products from the heat exchanger and exhaust conduit. Although the above-detailed hot air furnace employs an oil burner, powered gas-fired burners or other conventional burners may be used as well.

With the disclosed construction, an extremely high efficiency furnace is provided. Moreover, with the disclosed heat exchanger assembly, a relatively compact construction is realized.

It has also been found that with the present invention ancillary devices needed for controlling the exhausting of combustion products can be eliminated. As indicated above, the illustrated furnace does not require an induced draft blower to draw out the combustion byproducts. The disclosed furnace eliminates the need for a combustion relief box, which forms part of prior art furnaces. In furnaces of the type that utilize an induced draft blower, it was found that when the burner was ignited a combustion pulse was produced which necessitated the use of a combustion relief box to accommodate this initial pulse. The need for this device is eliminated in the disclosed furnace.

It has been found that a furnace constructed in accordance with the preferred embodiment of the invention, can achieve an efficiency of more than 98%. In addition, the relatively simple construction of the furnace renders it very serviceable and reliable.

Turning now to FIG. 4, the inventive hot air furnace is shown being adapted for use as a unit heater. The unit heater includes a frame structure defined in part by side walls 11 and 13, bottom portion 12a, top portion 10a and rear panel 14a. The unit heater of FIG. 4 operates in the same manner as the hot air furnace described above. In essence, the unit heater of FIG. 4 is the same as the hot air furnace of FIGS. 1–3 rotated 90° where the side wall 12 essentially becomes the bottom support 12a and the side panel 10 is rotated into the top panel 10 position of the unit heater. The burner 60 is not rotated such that it maintains an upright burning position.

During operation, comfort air is generated by the blower 24 and forced over the secondary heat exchanger 36, around the transfer channel 38 and over the drum like heat exchanger 34, as described above in reference to the hot air furnace, before exiting the unit heater through an air-directing vent 200. In the hot air furnace, the blower forces comfort air over the heat exchanger in a vertical manner where the comfort air exits the furnace through the plenum 150 (see FIG. 2) at the top portion of the furnace. With regard to the unit heater, the blower 26 forces air over the heat exchanger in a horizontal direction such that comfort air exits the unit heater through a air-directing vent 200 located on the side of the unit heater. The air-directing vent 200 is affixed to the unit heater in a position overlapping an exit duct in the side 13 of the unit heater to direct the heated comfort air exiting the unit heater to desired locations. The vent 200 includes a set of horizontal louvers 202 and a set of vertical louvers 204. The horizontal louvers 202 are pivotally mounted horizontally within the air directing vent to direct air in a manner horizontal to the direction of the passing comfort air. Likewise, vertical louvers 204 are pivotally mounted with in the air-directing vent to direct air in a direction vertical to the flow of the passing comfort air. This arrangement allows heated comfort air to be directed in many different location. The use of louvers as described is apparent to one of ordinary skill in the art.

As with the hot air furnace described above, the operation of the unit heater operates via the same mechanics. For instance, during combustion, air is taken up by the blower 119 through air intake 119a. As noted above, this air is a combination of air coming from outside the heating structure and air from inside the heating structure. Outside air communicates with the air intakes 119a via conduit 135 and louvers 137. Once air enters the blower, it proceeds through the combustion process as described above in relation to the hot air furnace eventually urging the combustion by-products out of the heating system through exhaust conduit 128.

The unit heater shown in FIG. 4 can be employed anywhere a typical unit heater is needed, i.e., suspended from the ceiling of a large spacious room. Further, it is apparent to one of ordinary skill in the art how to adapt the hot air furnace for use as a unit heater by the use of louvers for directing air in view of the present disclosure.

Although the invention has been described with a certain degree of particularity, it should be understood that those skilled in the art can make various changes to it without departing from the spirit or scope as hereinafter claimed.

I claim:

1. A hot air furnace comprising:
   a. a heat exchanging chamber wherein comfort air is heated by being forced through the chamber;
   b. a blower for urging comfort air through the heat exchanging chamber,
   c. a heat exchanger assembly located in the heat exchanging chamber and in heat exchanging contact with comfort air passing through the heat exchanging chamber, said heat exchanger comprising:
      i. a combustion member including a substantially cylindrical wall portion, wherein the combustion member communicates with a burner, further wherein an insulating material is affixed to the inside of the cylindrical wall portion,
      ii. a condenser portion positioned in the flow path of comfort air upstream from the combustion member in the heat exchanging chamber,
      iii. a transfer member connected to the end of the combustion member opposite of the burner and to providing a path for combustion gases from the combustion member to the condenser,
      iv. a diffuser member mounted within the combustion member wherein the diffuser is positioned in the combustion member to inhibit the flame generated by the burner from extending into the transfer member, and
   d. wherein the burner includes a combustion air blower which urges combustion gases through the heat exchanging assembly to an exhaust outlet.

2. The apparatus of claim 1 wherein the insulating material is a blanket.

3. The apparatus of claim 1 wherein the combustion air blower intakes air from a air intake chamber.

4. The apparatus of claim 3 wherein the air intake chamber includes a air feed from outside the heating structure such that air being fed to the blower is a mixture of air from outside the heating structure and air from inside the heating structure.

5. The apparatus of claim 1 wherein the burner is a natural gas-fired burner.

6. The apparatus of claim 1 wherein the burner is oil-fired.

7. The apparatus of claim 1 wherein the combustion gases produced exit the combustion member into the transfer member and further into the condenser where the gases condense from their gaseous state.

8. The apparatus of claim 1 wherein a condensate collector box communicates with the condenser, said condensate collector box including a pressure relief switch which shuts down the burner when excessive pressure is detected at the condensate collector box.

9. The apparatus of claim 1 wherein a high temperature cut off switch is in communication with the inside of the heat exchanging chamber, wherein the high temperature cut off switch shuts down the burner when excessive temperature is detected in the heat exchanging chamber.

10. The apparatus of claim 1 wherein a condensate collector box communicates with the condenser, said condensate collector box including an auxiliary limit switch which operates to shut down the burner if excessive temperatures are detected at the condensate box.

11. The apparatus of claim 1 wherein said combustion air blower is activated for sufficient time prior to burner ignition such that the heat exchanging assembly is "purged" before burner operation.

12. The apparatus of claim 1 wherein said combustion air blower continues operating after the burner is extinguished to "purge" the heat exchanging assembly upon terminating burner operation.

13. A hot air furnace comprising:
    a. a heat exchanging chamber wherein comfort air is heated by being forced through the chamber;
    b. a blower for urging comfort air through the heat exchanging chamber,
    c. a heat exchanger assembly located in the heat exchanging chamber and in heat exchanging contact with comfort air passing through the heat exchanging chamber, said heat exchanger comprising:
       i. a combustion member including a substantially cylindrical wall portion, wherein the combustion member communicates with a burner, further wherein an insulating blanket is affixed to the inside of the cylindrical wall portion,
       ii. a condenser portion positioned in the flow path of comfort air upstream from the combustion member in the heat exchanging chamber,
       iii. a transfer member connected to the end of the combustion member opposite of the burner and to providing a path for combustion gases from the combustion member to the condenser,
       iv. a diffuser member mounted within the combustion member wherein the diffuser is positioned in the combustion member to inhibit the flame generated by the burner from extending into the transfer member, and
    d. wherein the burner includes a combustion air blower which urges combustion gases through the heat exchanging assembly to an exhaust outlet.

14. The apparatus of claim 13 wherein the intake chamber includes a vent which leads outside the heating structure and wherein the feed air is a combination of the outside air and air present within the heating structure.

15. The apparatus of claim 13 wherein the combustion air blower intakes air from a air intake chamber.

16. The apparatus of claim 13 wherein the air intake chamber includes a air feed from outside the heating structure such that air being fed to the blower is a mixture of air from outside the heating structure and air inside the heating structure.

17. The apparatus of claim 13 wherein said burner is a natural gas-fired burner.

18. The apparatus of claim 13 wherein the burner is oil-fired.

19. The apparatus of claim 13 wherein substantially all of the combustion gases produced exit the combustion member into the transfer member to the condenser where in the condenser the gases condense from their gaseous state.

20. The apparatus of claim 13 wherein a condensate collector box communicates with the condenser, said condensate collector box including a pressure relief switch which shuts down the burner when excessive pressure is detected at the condensate collector box.

21. The apparatus of claim 13 wherein a high temperature cut off switch is in communication with the inside of the heat exchanging chamber, wherein the high temperature cut off switch shuts down the burner when excessive temperature is detected in the heat exchanging chamber.

22. The apparatus of claim 13 wherein a condensate collector box communicates with the condenser, said condensate collector box including an auxiliary limit switch which operates to shut down the burner if excessive temperatures are detected at the condensate box.

23. The apparatus of claim 13 wherein said combustion air blower is activated for sufficient time prior to burner ignition such that the heat exchanging assembly is "purged" before burner operation.

24. The apparatus of claim 13 wherein said combustion air blower continues operating after the burner is extinguished to "purge" the heat exchanging assembly upon terminating burner operation.

25. A hot air furnace comprising:
   a. a heat exchanging chamber wherein comfort air is heated by being forced through the chamber;
   b. a blower for urging comfort air through the heat exchanging chamber,
   c. a heat exchanger assembly located in the heat exchanging chamber and in heat exchanging contact with comfort air passing through the heat exchanging chamber, said heat exchanger comprising:
      i. a combustion member including a substantially cylindrical wall portion, wherein the combustion member communicates with a burner, further wherein an insulating material is affixed to the inside of the cylindrical wall portion,
      ii. a condenser portion positioned in the flow path of comfort air upstream from the combustion member in the heat exchanging chamber,
      iii. a transfer member connected to the end of the combustion member opposite of the burner and to providing a path for combustion gases from the combustion member to the condenser,
      iv. a diffuser member mounted within the combustion member wherein the diffuser is positioned in the combustion member to inhibit the flame generated by the burner from extending into the transfer member, and
   d. wherein the burner includes a combustion air blower which urges combustion gases through the heat exchanging assembly to an exhaust outlet said combustion air blower intakes air from an air intake chamber wherein the chamber includes a vent which leads outside the heating structure and wherein the feed air is a combination of the outside air and air present within the heating structure.

26. The apparatus of claim 25 wherein said insulating material is a blanket.

27. The apparatus of claim 25 wherein said burner is a natural gas-fired burner.

28. The apparatus of claim 25 wherein the burner is oil-fired.

29. The apparatus of claim 25 wherein substantially all of the combustion gases produced exit the combustion member into the transfer member to the condenser where in the condenser the gases condense from their gaseous state.

30. The apparatus of claim 25 wherein a condensate collector box communicates with the condenser, said condensate collector box including a pressure relief switch which shuts down the burner when excessive pressure is detected at the condensate collector box.

31. The apparatus of claim 25 wherein a high temperature cut off switch is in communication with the inside of the heat exchanging chamber, wherein the high temperature cut off switch shuts down the burner when excessive temperature is detected in the heat exchanging chamber.

32. The apparatus of claim 25 wherein a condensate collector box communicates with the condenser, said condensate collector box including an auxiliary limit switch which operates to shut down the burner if excessive temperatures are detected at the condensate box.

33. The apparatus of claim 25 wherein said combustion air blower is activated for sufficient time prior to burner ignition such that the heat exchanging assembly is "purged" before burner operation.

34. The apparatus of claim 1 wherein said combustion air blower continues operating after the burner is extinguished to "purge" the heat exchanging assembly upon terminating burner operation.

35. A hot air furnace comprising:
   a. a heat exchanging chamber wherein comfort air is heated by being forced through the chamber;
   b. a blower for urging comfort air through the heat exchanging chamber,
   c. a heat exchanger assembly located in the heat exchanging chamber and in heat exchanging contact with comfort air passing through the heat exchanging chamber, said heat exchanger comprising:
      i. a combustion member including a substantially cylindrical wall portion, wherein the combustion member communicates with a burner, further wherein an insulating blanket is affixed to the inside of the cylindrical wall portion,
      ii. a condenser portion positioned in the flow path of comfort air upstream from the combustion member in the heat exchanging chamber said condenser portion including a condensate collector box at its furthest downstream location, further wherein said condenser box communicates with a pressure relief switch which shuts down the burner when excessive pressure is detected at the condensate collector box, said condensate collector box further communicates with an auxiliary switch which operates to shut down the burner when excessive temperature is detected at the condensate collector box,
      iii. a transfer member connected to the end of the combustion member opposite of the burner and to providing a path for combustion gases from the combustion member to the condenser,
      iv. a diffuser member mounted within the combustion member wherein the diffuser is positioned in the combustion member to inhibit the flame generated by the burner from extending into the transfer member, and
   d. wherein the burner includes a combustion air blower which urges combustion gases through the heat exchanging assembly where the gases exit the combustion member and enter into the transfer member to the condenser where the gases condense from their gaseous state, said combustion air blower intaking air from an air intake chamber wherein the chamber includes a vent which leads outside the heating structure and wherein the feed air is a combination of the outside air and air present within the heating structure, wherein said combustion air blower is activated for sufficient time prior to burner ignition such that the heat exchanging assembly is "purged" before burner operation and wherein said combustion air blower continues operating after the burner is extinguished to "purge" the heat exchanging assembly upon terminating burner operation.

36. A unit heater comprising:
   a. a heat exchanging chamber wherein comfort air is heated by being forced through the chamber;
   b. a blower for urging comfort air through the heat exchanging chamber,
   c. a heat exchanger assembly located in the heat exchanging chamber and in heat exchanging contact with comfort air passing through the heat exchanging chamber, said heat exchanger comprising:
      i. a combustion member including a substantially cylindrical wall portion, wherein the combustion member communicates with a burner, further wherein an insulating material is affixed to the inside of the cylindrical wall portion,
      ii. a condenser portion positioned in the flow path of comfort air upstream from the combustion member in the heat exchanging chamber,
      iii. a transfer member connected to the end of the combustion member opposite of the burner and to providing a path for combustion gases from the combustion member to the condenser,
      iv. a diffuser member mounted within the combustion member wherein the diffuser is positioned in the combustion member to inhibit the flame generated by the burner from extending into the transfer member, and
   d. wherein the burner includes a combustion air blower which urges combustion gases through the heat exchanging assembly to an exhaust outlet, and
   e. an air-directing vent at one end of the unit heater wherein comfort air passing through the vent can be directed to desired locations.

37. The unit heater of claim 36 wherein said air directing vent includes a set of horizontal louvers to direct comfort air in a direction horizontal to the flow of air over the louvers and a set of vertical louvers to direct comfort air in a direction vertical to the flow of comfort over the louvers.

38. A unit heater comprising:
   a. a heat exchanging chamber wherein comfort air is heated by being forced through the chamber;
   b. a blower for urging comfort air through the heat exchanging chamber,
   c. a heat exchanger assembly located in the heat exchanging chamber and in heat exchanging contact with comfort air passing through the heat exchanging chamber, said heat exchanger comprising:
      i. a combustion member including a substantially cylindrical wall portion, wherein the combustion member communicates with a burner, further wherein an insulating blanket is affixed to the inside of the cylindrical wall portion,
      ii. a condenser portion positioned in the flow path of comfort air upstream from the combustion member in the heat exchanging chamber said condenser portion including a condensate collector box at its furthest downstream location, further wherein said condenser box communicates with a pressure relief switch which shuts down the burner when excessive pressure is detected at the condensate collector box, said condensate collector box further communicates with an auxiliary switch which operates to shut down the burner when excessive temperature is detected at the condensate collector box,
      iii. a transfer member connected to the end of the combustion member opposite of the burner and to providing a path for combustion gases from the combustion member to the condenser,
      iv. a diffuser member mounted within the combustion member wherein the diffuser is positioned in the combustion member to inhibit the flame generated by the burner from extending into the transfer member, and
   d. wherein the burner includes a combustion air blower which urges combustion gases through the heat exchanging assembly where the gases exit the combustion member and enter into the transfer member to the condenser where the gases condense from their gaseous state, said combustion air blower intaking air from an air intake chamber wherein the chamber includes a vent which leads outside the heating structure and wherein the feed air is a combination of the outside air and air present within the heating structure, wherein said combustion air blower is activated for sufficient time prior to burner ignition such that the heat exchanging assembly is "purged" before burner operation and wherein said combustion air blower continues operating after the burner is extinguished to "purge" the heat exchanging assembly upon terminating burner operation, and
   e. an air-directing vent at one end of the unit heater wherein comfort air passing through the vent can be directed to desired locations wherein the air-directing vent includes a set of horizontal louvers to direct comfort air in a direction horizontal to the flow of air over the horizontal louvers and a set of vertical louvers to direct comfort air in a direction vertical to the flow of comfort air over the vertical louvers.

* * * * *